United States Patent [19]

Agrawal

[11] 4,415,280
[45] Nov. 15, 1983

[54] HYDRODYNAMIC FLUID FILM BEARING

[75] Inventor: Giridhari L. Agrawal, Simsbury, Conn.

[73] Assignee: United Technologies Corporation, Hartford, Conn.

[21] Appl. No.: 324,314

[22] Filed: Nov. 23, 1981

[51] Int. Cl.$^3$ .............................................. F16C 32/06
[52] U.S. Cl. .................................... 384/103; 384/106
[58] Field of Search ............... 384/103, 106, 119, 202, 384/215, 398, 399, 123, 124, 105

[56] References Cited

U.S. PATENT DOCUMENTS

| | | | |
|---|---|---|---|
| 3,635,534 | 1/1972 | Barnett | 384/106 |
| 3,795,427 | 3/1974 | Licht et al. | 384/103 |
| 3,884,534 | 5/1975 | Winn | 384/106 |
| 3,951,474 | 4/1976 | Hughes et al. | 384/103 |
| 3,957,317 | 5/1976 | Silver | 384/103 |
| 4,005,914 | 2/1977 | Newman | 384/103 |
| 4,082,375 | 4/1978 | Fortmann | 384/105 |
| 4,116,503 | 9/1978 | Licht | 384/123 |
| 4,133,585 | 1/1979 | Licht | 384/103 |
| 4,196,945 | 4/1980 | Miller, Jr. | 384/106 |
| 4,208,076 | 6/1980 | Gray et al. | 384/105 |
| 4,222,618 | 9/1980 | Miller, Jr. | 384/99 |
| 4,223,958 | 9/1980 | Gray | 384/99 |
| 4,247,155 | 1/1981 | Fortmann | 384/124 |
| 4,274,683 | 6/1981 | Gray et al. | 384/106 |
| 4,2129,054 | 10/1981 | Miller, Jr. | 384/106 |

*Primary Examiner*—Stuart S. Levy
*Assistant Examiner*—Thomas R. Hannon
*Attorney, Agent, or Firm*—John Swiatocha

[57] ABSTRACT

A hydrodynamic fluid film journal bearing comprises a stationary retaining member 15, a rotatable journal 20 disposed therewithin and an insert comprising a smooth cylindrical foil element 25 and a corrugated, cylindrical, resilient backing member 45 disposed radially outwardly from the foil. The foil element and the resilient backing member are fixed at ends thereof to the retaining member such that the backing member extends from the fixed end, in an opposite circumferential direction from that of the extension of the foil element from the fixed end thereof. The journal is supported by a fluid film layer maintained by relative rotary motion between the journal and the foil element, the backing accommodating deflections of the foil and excursions of the journal due to fluid pressure and loading of the bearing.

10 Claims, 4 Drawing Figures

HYDRODYNAMIC FLUID FILM BEARING

DESCRIPTION

1. Technical Field

This invention relates generally to hydrodynamic fluid film bearings and more particularly to such bearings employing one or more foils to establish and maintain a fluid film within the bearing and a resilient backing member accommodating deflections of the foil and excursions of the rotating portion of the bearing.

2. Background Art

Recent efforts to improve high speed bearings such as those used in turbo-compressor units employed in modern air cycle machinery for aircraft cooling and ventilation, have led to the development of fluid film hydrodynamic bearings such as those disclosed and claimed in U.S. Pat. Nos. 4,082,375 and 4,247,155 to Fortmann, and 4,116,503 and 4,133,585 to Licht, all assigned to the assignee of the present invention, and U.S. Pat. No. 3,635,534 to Barnett. Generally, fluid film hydrodynamic bearings such as those disclosed in the above named patents operate on the principle that a rotating member such as a shaft or thrust runner and an adjacent element such as a smooth foil or the like, establish and maintain a pressurized fluid film layer therebetween, the fluid film layer, sometimes referred to as a fluid film wedge, providing a lubricated support for the rotating member. Often, a resilient spring or backing means is disposed between the foil and a stationary member (otherwise referred to as a cartridge, retainer or base) to accommodate both deflections of the foil due to the pressurization thereof by the fluid film layer and excursions of the rotating member due to bearing loading and imbalances thereof such as whirl and the like.

In the resilient foil journal bearing disclosed in U.S. Pat. No. 4,133,585 to Licht, the foil and resilient backing member are combined in a continuous length of foil coiled into a plurality of layers, the innermost layer comprising a smooth bearing surface and an outer layer, having a quasi-polygonal configuration which functions as the resilient backing member, accommodating excursions of the journal due to loading and imbalances. The multifoil layer construction provided by the coiled foil is advantageous in certain respects. For example, a multilayer foil is thought to provide enhanced coulomb damping, providing energy dissipation particularly suitable for hydrodynamic bearings. Moreover, such multifoil constructions also exhibit larger rotor excursion tolerance, good accommodation of differential expansion of the foils, accommodation of manufacturing misalignments and imperfections in the foils, tolerance to contaminants and good wipe-wear characteristics at high speeds, and also during starting and stopping. While the coiled multilayer foil structure exhibits the above named advantages, improvements in such bearings in the areas of manufacturability, damping characteristics, ease in assembly/disassembly and foil replacement, resistance to foil telescoping, and convenience in providing multithickness foil layers are continually being sought.

DISCLOSURE OF INVENTION

It is therefore a principle object of the present invention to provide an improved hydrodynamic fluid film bearing having a multilayer foil insert.

It is another object of the present invention to provide such a bearing having enhanced resistance to foil telescoping.

It is another object of the present invention to provide such a bearing characterized by an ease of manufacture as well as ease of assembly/disassembly, and foil replacement.

It is another object of the present invention to provide such a bearing having enhanced coulomb damping.

These and other objects which will become more apparent from the following detailed description taken in connection with the appended claims and accompanying drawings are attained by the hydrodynamic fluid film bearing of the present invention which includes a stationary retaining member, a rotating member defining a spacing with the stationary member, the spacing accommodating an insert comprising at least one smooth foil element and one resilient backing element fixed to the retainer such that during dry friction damping, these elements rub in generally opposite circumferential directions for enhanced energy dissipation. In the preferred embodiment, the bearing includes a second foil element concentrically disposed with respect to the first foil element and resilient backing member, the two foils and backing member being formed in generally open cylindrical shapes for ease in manufacturability. Assembly and disassembly for replacing the insert is enhanced by the provision of a keyway in the interior of the retaining member, the two foils and resilient backing member being fixed to a single key which is received within the keyway for retention of the insert within the bearing. The employment of three distinct members in the insert rather than a single coiled member eliminates foil telescoping.

BEST MODE FOR CARRYING OUT THE INVENTION

Figure 1:
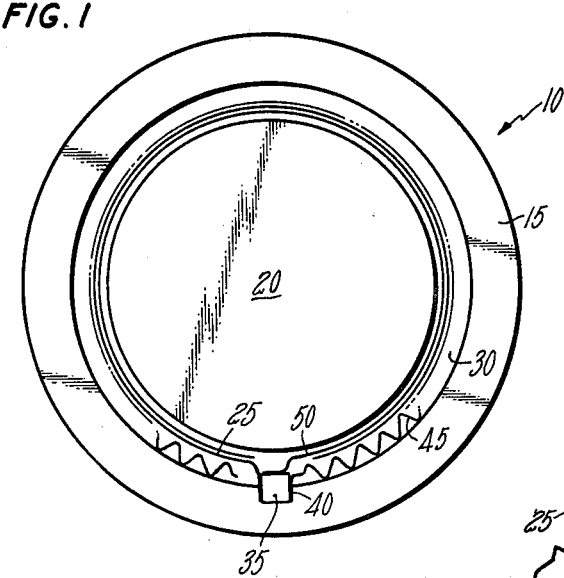
FIG. 1 is an end view of the hydrodynamic fluid film journal bearing of the present invention.

Referring to FIG. 1, a hydrodynamic fluid film journal bearing 10 of the present invention includes a stationary retaining member or cartridge 15 also known as a shell or retainer which encloses a rotary shaft or journal 20 adapted for connection to a high speed rotor for such equipment as high speed electric motors or bladed rotors for use in any type of high speed turbo-compressor such as those employed in air cycle machinery for cooling and pressurizing aircraft cabins. A first smooth foil element 25 is disposed within spacing or clearance 30, this foil being generally of an open or split (along the side) cylindrical shape and fixed along an edge of the opening thereof to a side of key 35 slidably received within keyway 40 provided in retaining member 15. A corrugated resilient backing member or spring 45 is disposed within clearance 30 between foil 25 and retaining member 15, the spring also being generally of an open or split (along the side) cylindrical shape and, as foil 25, is fixed along its edge to key 35 on a face thereof opposite that to which the foil is fixed. This attachment of the foil and spring to key 35 provides enhanced manufacturability and ease in overhaul as well as facilitating removal of the foil and spring for replacement with foils and a spring of differing properties for adjusting bearing properties such as load capacity, damping and the like.

Bearing 10 operates under the basic principle of the generation of hydrodynamic pressure in that portion of clearance 30 between journal 20 and foil 25. Under theoretical no load conditions, the geometric centers of of journal 20 and the cylinders formed by foil 25, and retaining member 15, coincide. However, under actual operating conditions, there is always some load on journal 20 which eccentrically displaces the center of that member from the centers of foil 25 and retaining member 25 thereby defining with foil 25, a wedge shaped clearance. Rotation of the journal causes the geometric center of the journal to orbit about the geometric center of the foil causing the wedge shaped clearance to so orbit the foil center. As those skilled in the art will recognize, the eccentric positioning of the shaft with respect to the foil and the continuous rotation of the shaft causes the establishment and maintenance of regions of high and low pressures between the shaft and foil which causes flow of fluid from the high pressure zone to the low pressure zone resulting in a squeezing of the fluid between the shaft and the foil, this phenomenon defining supporting fluid film which supports radial loads on the bearing and prevents the journal from contacting the foil.

The spring serves basically two purposes. It provides a resilient deformable backing which aids in the formation of the supporting fluid film wedge described hereinabove by accommodating certain foil deflections due to the pressurization thereof by the film. The spring also provides an overall load carrying capacity and accommodation of journal excursions due to journal loading and imbalances.

As those skilled in the art will recognize, disturbances to journal 20 are damped by compression or squeezing of the fluid film between the journal and an adjacent foil, compression of the corrugations in resilient backing member or spring 45, and coulomb damping. For enhanced coulomb damping, it has been the practice to provide multiple foil layers in the bearing insert between the journal and retaining member, one example of such multiple layers being that described in the aforementioned patent to Licht wherein a single foil is provided in a coiled configuration. Still referring to FIG. 1, in accordance with the present invention, to enhance coulomb damping, a second foil element 50 is provided radially inwardly of, and concentric to first foil element 25 and spring 45. As shown, second foil element 50 is, like the spring and the first foil element, of an open cylindrical shape and is fixed at a first end thereof to an inner surface of key 35. It is thus noted that disturbances to journal 20 are damped at least in part by coulomb damping between first and second foil elements 25 and 50 as well as between first foil element 25 and the apices of spring 45.

By the present invention, the above noted coulomb damping is significantly enhanced by mounting the foil elements and spring to retaining member 15 such that one or more of these elements extends from its first (mounted) end, circumferentially in a direction opposite that of the extension of an adjacent element or member. Thus, it is seen that radially outward pressure of the fluid film between journal 20 and first foil 50 urges that foil element outwardly, opening the cylinder formed by that foil and imparting a generally clockwise movement to that cylinder. Coulomb damping is achieved by a rubbing of second or inner foil element 50 against first or outer foil element 25. This coulomb damping is enhanced by the extension of first foil element 25 in a circumferential direction opposite that of the second foil element. Still referring to FIG. 1, it is seen that as pressurization of the fluid film urges the second foil element outwardly, it in turn urges the first (outer) foil element outwardly causing that foil element to open, and more counterclockwise, i.e., in a direction opposite that of the second foil element. It will be appreciated by those skilled in the art that movement of the foil elements in directions opposite to one another achieves greater energy dissipation and damping than movement in the same circumferential direction as would be the case where the foil layers extend in the same direction from the mount thereof or equivalently, where the foils comprise adjacent layers of a single coiled foil element.

Still referring to FIG. 1, it is seen that outward movement of the foils under pressurization from the fluid film urges the foils against the spring, causing the spring to open outwardly and move in a generally clockwise direction. However, since as set forth hereinabove, the first foil element, when pressurized, moves in a generally counterclockwise direction, enhanced coulomb damping due to opposed movement of the spring and first foil element is achieved due to the opposite directions of circumferential extension of those members from their mounting locations.

As set forth hereinabove, foils 25 and 50 and spring 45 are fixed to key 35. The method of attachment of these elements to the key will, of course, depend on the materials used in the foils, spring and key, welding or brazing being preferred where these elements are formed from metallic materials. In the preferred embodiment, the foils and spring are formed from Inconel ® and the key is formed from steel.

Figure 2:
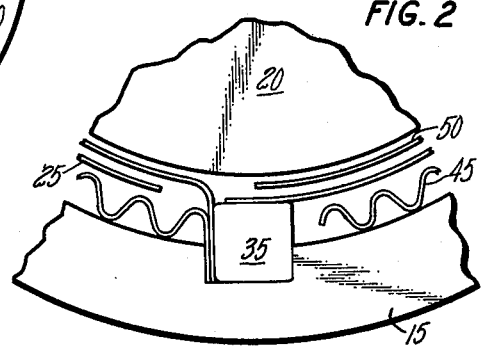
FIG. 2 is an enlarged, fragmentary end view of an alternate embodiment of the hydrodynamic bearing of the present invention.

Referring to FIG. 2, an alternate embodiment of the hydrodynamic fluid film bearing of the present invention is shown. In this embodiment, inner foil 50 is attached to the left face of key 35, and outer foil 25 is attached to the upper or inner face of the key by any of the appropriate methods outlined above. Spring 45 is, in this embodiment, retained by surface contact with the key and the retaining member 15, and is not positively attached to either of those members. It has been found that such spring retention lessens the criticality of the angular disposition of the fixed end portion of the spring from the remainder thereof for proper bearing operation, thus contributing to the ease of bearing manufacturability.

Figure 3:
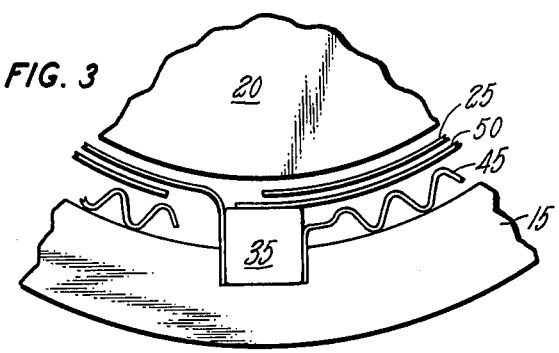
FIG. 3 is an end view of a second alternate embodiment of the hydrodynamic bearing of the present invention.
Figure 4:
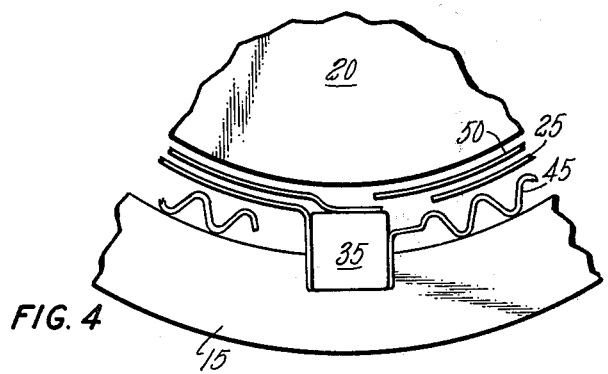
FIG. 4 is an end view of a third alternate embodiment of the hydrodynamic bearing of the present invention.

FIGS. 3 and 4 are also illustrative of alternate embodiments of the present invention. In FIG. 3, the first foil element is disposed radially inwardly of the second foil element, in which case only the two foil elements extend in circumferentially opposite directions from each other, second (outer) foil 50 extending in the same circumferential direction as adjacent spring 45. Thus, it is seen that for a spring and foils of identical properties to those of the bearing shown in FIG. 1, those elements in the bearing of FIG. 2 will exhibit somewhat less coulomb damping since the outer foil element and the spring move in the same circumferential direction when opening under pressure. Of course, for certain loads, less damping may be desirable and it is readily seen that the attachment of the spring and foils to key 35 readily allows bearing inserts to be changed for tailoring bearing damping to bearing load conditions.

A third alternate embodiment of the present invention is illustrated in FIG. 4 wherein both first and second foil elements extend in clockwise circumferential direction from their locations of mounting to key 35. Accordingly, it is seen that only spring 45 and first foil element 25 extend in opposite directions for enhanced coulomb damping, the coulomb damping between the two foils being somewhat less than that which would be obtained from foils extending in opposite directions with respect to each other as illustrated in FIGS. 1 and 2.

The dimensions of the retaining member, journal, foils and spring will, of course, depend on the application and expected loadings of the bearing. For example, where the bearing is employed in a 50,000–100,000 RPM turbocompressor unit for an air cycle air conditioning system, foils 25 and 50 are on the order of 0.0089–0.0102 cm (0.0035–0.004 in.) thick, and spring 45 is approximately 0.0152–0.0178 cm (0.006–0.007 in.) thick. The bearing is about 5.08 cm (2.0 in.) in diameter and 5.84 cm (2.3 in.) in length.

Therefore, it will be appreciated that with the construction of the hydrodynamic fluid film journal bearing of the present invention, enhanced coulomb damping is attained. The foil elements and spring are readily attached to key 35 by any suitable techniques for ease in manufacture. The simple, generally open cylindrical shapes of these elements also enhances ease and economy of manufacture. As set forth hereinabove, the key-slot arrangement for mounting the foil and spring insert allows the insert to be easily replaced for ease in tailoring the bearing properties for various load conditions. Since the foil elements and spring are discrete members and are not coiled from a single foil element, telescoping of these members due to axial loading and resulting in possible damage to the foils by rubbing with the journal are minimized. Additionally, the provision of discrete foils rather than a single coiled foil allows foils of varying properties of thickness, residence and the like to be used for precise tailoring of bearing properties.

Having thus described the invention, what is claimed is:

1. A hydrodynamic fluid film journal bearing comprising a stationary retaining member, a rotatable journal defining with said stationary member, an annular spacing therebetween, a first smooth, generally cylindrical foil element disposed within said spacing, said journal being supported on a pressurized fluid film layer maintained by relative rotary movement between said journal and said first foil element, said journal bearing further comprising a generally cylindrical resilient backing member being disposed in said spacing generally concentric to, and radially outwardly from said first foil element, said resilient backing member accommodating deflection of said foil element due to pressurization thereof by said fluid film layer and excursions of said journal due to loading and imbalances thereof, said hydrodynamic fluid film bearing being characterized by:
said first foil element and said resilient backing member being fixed to said retaining member and extending therearound in opposite circumferential directions, and
a second smooth, generally cylindrical foil element fixed to said retaining member and disposed in said spacing, radially inwardly of said resilient backing member and concentric to said first foil element and said resilient backing member,
whereby enhanced coulomb damping is effected by rubbing contact between said first foil element and resilient backing member in said opposite circumferential directions of extension thereof and by rubbing contact between said second smooth foil element and at least one of said first foil element and said resilient backing member in opposite circumferential directions of extension thereof.

2. The hydrodynamic fluid film journal bearing of claim 1 further characterized by said first and second smooth foil elements and said resilient backing member being fixed at to said retaining member and extending therearound in circumferential directions, the circumferential direction of extension of said second smooth foil element being opposite that of at least one of said first smooth foil element and said resilient backing member.

3. The hydrodynamic fluid film journal bearing of claim 4 and further characterized by said second foil element extending in a circumferential direction opposite that of said first foil element and disposed radially inwardly therefrom.

4. The hydrodynamic fluid film journal bearing of claim 4 and further characterized by said second foil element extending in a circumferential direction opposite that of said first foil element and disposed radially outwardly therefrom.

5. The hydrodynamic fluid film journal bearing of claim 4 and further characterized by said second foil element extending in a circumferential direction opposite that of said resilient backing member.

6. The hydrodynamic fluid film journal bearing of claim 1 and further characterized by said retaining member including a slot therein and said first foil element and said resilient backing member at first ends thereof being mounted on a key received within said slot.

7. The hydrodynamic fluid film journal bearing of claim 1 and further characterized by said retaining member including a slot therein and said first foil element and resilient backing member at first ends thereof being mounted on a key received within said slot, said second foil element being unattached to said key and restrained at a first end thereof by surface-to-surface contact with said key and said slot.

8. The hydrodynamic fluid journal bearing of claim 1 further characterized by said first foil element and said resilient backing member, being split longitudinally along the sides thereof.

9. The hydrodynamic fluid journal bearing of claim 1 further characterized by said first and second foil elements and said resilient backing member, being split longitudinally along the sides thereof.

10. The hydrodynamic fluid film bearing of claim 1 further characterized by said first and second foil elements and said resilient backing member being discrete elements.

* * * * *

UNITED STATES PATENT AND TRADEMARK OFFICE
CERTIFICATE OF CORRECTION

PATENT NO. : 4,415,280
DATED : November 15, 1983
INVENTOR(S) : GIRIDHARI L. AGRAWAL It is certified that error appears in the above-identified patent and that said Letters Patent is hereby corrected as shown below:

Column 1, line 66, "principle" should read --principal--

Column 3, line 11, after "centers" delete "of"

Column 3, lines 16-17, "retaining member 25" should read --retaining member 15--

Column 6, line 26, "Claim 4" should read --Claim 2--

Column 6, line 31, "Claim 4" should read --Claim 2--

Column 6, line 36, "Claim 4" should read --Claim 2--

Signed and Sealed this

Third Day of April 1984

[SEAL]

Attest:

GERALD J. MOSSINGHOFF

Attesting Officer

Commissioner of Patents and Trademarks